United States Patent           (10) Patent No.:     US 12,356,972 B1
Salopek et al.                 (45) Date of Patent:         Jul. 15, 2025

(54) SYSTEM AND METHOD FOR WIRELESS PLANER BOARD CLIP RELEASE

(71) Applicant: 'Eye Catcher LLC, Avon Lake, OH (US)

(72) Inventors: Nathaniel Salopek, Lakewood, OH (US); Joseph Golob, Avon Lake, OH (US)

(73) Assignee: 'Eye Catcher LLC, Avon Lake, OH (US)

( * ) Notice: Subject to any disclaimer, the term of this patent is extended or adjusted under 35 U.S.C. 154(b) by 0 days.

(21) Appl. No.: 18/415,115

(22) Filed: Jan. 17, 2024

Related U.S. Application Data

(60) Provisional application No. 63/440,066, filed on Jan. 19, 2023.

(51) Int. Cl.
    *A01K 91/08*    (2006.01)

(52) U.S. Cl.
    CPC .................................... *A01K 91/08* (2013.01)

(58) Field of Classification Search
    CPC ...................................................... A01K 91/08
    See application file for complete search history.

(56) References Cited

U.S. PATENT DOCUMENTS

| | | | |
|---|---|---|---|
| 1,606,240 A | 11/1926 | Klaserner | |
| 2,572,427 A | 10/1951 | Anglim | |
| 2,901,857 A | 8/1959 | Lockert | |
| 4,856,222 A * | 8/1989 | Hannam | A01K 91/02 43/4.5 |
| 5,548,919 A | 11/1996 | Hicks | |
| 5,782,033 A * | 7/1998 | Park | A01K 97/125 43/17 |
| 5,867,932 A * | 2/1999 | Reiger | A01K 91/08 43/43.1 |
| 5,875,583 A | 3/1999 | Church | |
| 6,119,389 A | 9/2000 | Walker | |
| 6,243,983 B1 * | 6/2001 | Walker | A01K 97/125 43/43.12 |
| 6,256,924 B1 | 7/2001 | Walker | |
| 6,789,350 B1 | 9/2004 | Link | |
| 7,152,362 B2 | 1/2006 | Holbrook | |
| 7,337,578 B2 | 3/2008 | Pieczynski | |
| 7,367,153 B1 | 5/2008 | Koch, III | |
| 7,380,366 B1 | 6/2008 | Barrow | |
| 7,406,796 B1 | 11/2008 | Koch | |
| 7,469,498 B2 | 12/2008 | Brinker | |
| 7,578,092 B2 | 8/2009 | Spickelmire | |
| 7,644,534 B2 | 1/2010 | Hagen | |
| 7,861,454 B2 | 1/2011 | Perkin | |

(Continued)

*Primary Examiner* — Richard G Davis
(74) *Attorney, Agent, or Firm* — Kramer Law Clinic

(57) ABSTRACT

According to one aspect, a trolling apparatus includes a planer board having a main body with a first side, a second side, a front end, a rear end, and a top edge and a bottom edge creating a water-tight compartment. The trolling apparatus also includes a front lip that connects to the front end of the main body. Further, the trolling apparatus includes a release apparatus mounted to the first side of the planer board. The release apparatus is remotely controllable between an open position and a closed position and configured to grip a front portion of a fishing line when in the closed position and release the front portion of the fishing line when in the open position.

20 Claims, 7 Drawing Sheets

(56) References Cited

U.S. PATENT DOCUMENTS

| | | | |
|---|---|---|---|
| 7,971,386 B2 | 7/2011 | Garrett | |
| 8,176,675 B2 | 5/2012 | Martinsen | |
| 8,181,380 B2 * | 5/2012 | Lankinen | A01K 91/08 43/4.5 |
| 8,464,461 B1 | 6/2013 | Perkin | |
| 8,695,271 B1 | 4/2014 | Ehlers | |
| 8,839,547 B2 | 9/2014 | Perkin | |
| 9,648,859 B2 | 5/2017 | Neimann | |
| 9,930,876 B2 | 4/2018 | Solberg | |
| 10,070,637 B2 | 8/2018 | Wakefield | |
| 10,701,919 B2 | 7/2020 | Porter | |
| 10,751,617 B2 | 8/2020 | Blackadar | |
| 10,823,816 B2 * | 11/2020 | Zdroik | G01S 19/14 |
| 10,827,735 B2 | 11/2020 | Haensgen | |
| 10,881,092 B2 | 1/2021 | Rosher | |
| 11,102,968 B2 | 8/2021 | Ferger | |
| 11,229,195 B2 | 1/2022 | Wakefield | |
| 11,330,810 B2 | 5/2022 | Bloss | |
| 11,382,322 B2 * | 7/2022 | Chapel | A01K 97/12 |
| 11,388,895 B2 | 7/2022 | Vergara | |
| 2007/0173139 A1 | 7/2007 | Gierke | |
| 2021/0282384 A1 * | 9/2021 | Stackhouse | A01K 91/06 |
| 2022/0061297 A1 | 3/2022 | Yasuda | |

* cited by examiner

SYSTEM AND METHOD FOR WIRELESS PLANER BOARD CLIP RELEASE

RELATED APPLICATIONS

This application claims priority to U.S. Prov. Application Ser. No. 63/440,066 filed on Jan. 19, 2023, which is expressly incorporated herein by reference.

TECHNICAL FIELD

The apparatuses, systems, and methods described herein are generally directed toward a planer board, and more particularly directed toward a planer board that can be controlled remotely.

BACKGROUND

Trolling is a fishing method where one or more fishing lines attached with lures or bait are drawn through water behind a moving boat. Trolling with a planer board is a specific technique that involves using planer boards to spread out fishing lines away from the boat, allowing anglers to cover a wider area and avoid tangling lines. Each planer board is attached to a fishing line and is towed behind a boat. As the boat travels, it attracts the fish by making it seem as though the bait is moving in the water. Typically, when a fish strikes, it pulls on the fishing line and a release clip on the planer board opens releasing the line from the side of the planer board and allowing the angler to grab the fishing rod and begin reeling in the line with the planer board and the fish hooked on the lure.

BRIEF DESCRIPTION

According to one aspect, a trolling apparatus includes a planer board having a main body with a first side, a second side, a front end, a rear end, and a top edge and a bottom edge creating a water-tight compartment. The trolling apparatus also includes a front lip that connects to the front end of the main body. Further, the trolling apparatus includes a release apparatus mounted to the first side of the planer board. The release apparatus is remotely controllable between an open position and a closed position and configured to grip a front portion of a fishing line when in the closed position and release the front portion of the fishing line when in the open position.

A system for trolling includes a planer board having a release apparatus configured to grip a front portion of a fishing line when in a closed position and release the portion of the fishing line when in an open position. The system for trolling also includes a portable device for remotely controlling the release apparatus from the closed position to the open position. Further, the system for trolling includes a processor operatively connected for computer communication to the planer board and the trolling device. The processor, upon receiving a control signal from the portable device, controls an actuator to move the release apparatus between the open position and the closed position.

According to another aspect, a method for trolling includes sensing a pressure value from a pressure sensor mounted to a planer board and transmitting the pressure value to a portable device. The release apparatus then receives a control signal from the portable device, which actuates the release apparatus to an open position, thereby automatically releasing a fishing line.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

When using some planer boards, it may be difficult to pull the fishing line free from the planer board when a fish strikes or when the fisherman wants to retrieve the lure. The clips used to hold the fishing line in place may be inconsistent, which is an issue because a planer board that does not release the fishing line has significant resistance within the water and leaves the potential for lines to tangle with each other. Combined with the weight of the fish, it makes the fisherman's job very arduous to reel in their catch and often the fish gets off the hook in the process.

Another issue that some inline planer boards face is strike detection. It may be difficult to tell when a fish bites the lure that is attached to the inline planer board. The planer board itself may move back in the water relative to the boat when the extra drag from the fish is added, but this change can be miniscule if the biting fish is small. Accordingly, a planer board with an electronically actuated clip that releases the fishing line and includes accurate strike detection is desirable.

Figure 1:
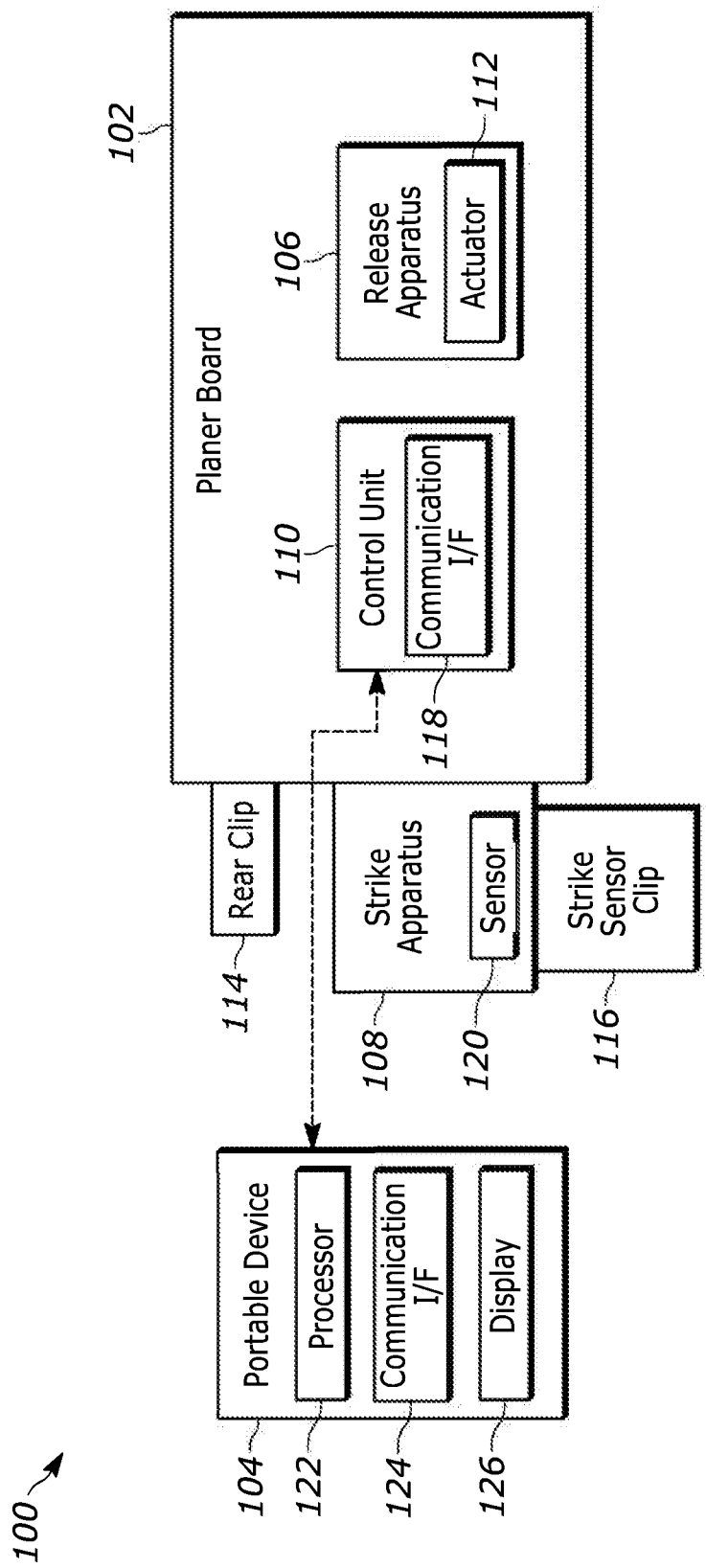
FIG. 1 is a block system diagram including a planer board and a portable device according to one exemplary embodiment.

FIG. 1, illustrates a system 100 for trolling including a planer board 102 and a portable device 104. The planer board 102 is made of buoyant, watertight plastic that holds electrical circuitry. Generally, the planer board 102 has a release apparatus 106 (e.g., a side clip) for securing a front portion of a fishing line and releasing the fishing line, a strike apparatus 108 for detecting a fish strike, and a rear clip 114 and a strike sensor clip 116 for securing a rear portion of a fishing line. The release apparatus 106 includes an actuator 112. The strike apparatus 108 includes a pressure sensor 120. Furthermore, the planer board 102 includes a control unit 110 (e.g., a processor), which can include a communication interface (I/F) 118. The portable device 104 generally includes a processor 122, a communication interface (I/F) 124, and a display 126. As will be discussed herein, the portable device 104 is in computer communication with the planer board 102 for communicating strike data (e.g., a measurement from the pressure sensor 120) and for remotely controlling the release apparatus 106 between an open position and a closed position, wherein when in an open position, the fishing line is released from the release apparatus 106.

The actuator 112 can include a servo motor or other type of mechanism to move one or more components of the release apparatus 106 to an open position and/or a closed position. The control unit 110 can include logic circuitry with hardware, firmware, and software architecture frameworks for facilitating control of the planer board 102, for example, controlling the release apparatus 106 and/or receiving measurement values from the pressure sensor 120. In some embodiments, the control unit 110 can store application frameworks, kernels, libraries, drivers, application program interfaces, among others, to execute and control hardware and functions discussed herein. Although not shown in FIG. 1, in some embodiments, the planer board 102 and/or the control unit 110 can include a memory and/or a data store for storing data and/or instructions.

The communication I/F 118 can include software and hardware to facilitate data input and output between the components of the planer board 102 and other components of the system 100, namely, the portable device 104. Specifically, the communication I/F 118 can include network interface controllers (not shown) and other hardware and software that manages and/or monitors connections and controls bi-directional data transfer between the communication I/F 118 and other components of the system 100 using, for example, a network (not shown). The communication I/F 118 can facilitate communication (e.g., exchange data, transmit control signals) with the communication I/F 124, using for example, radiofrequency communication (e.g., an antenna 220) or another type of wireless communication. In one example, the control unit 110 can transmit a pressure value measured by the pressure sensor 120 to the portable device 104.

The pressure sensor 120 measures an externally generated force (e.g., from a fish) on the fishing line 218. The pressure sensor 120 can generate a data stream and/or a signal representing the stimulus, analyze the signal and/or transmit the signal to another component, for example the control unit 110 and/or the portable device 104. In one embodiment, the pressure sensor 120 utilizes a 0-5 kg thin film force sensitive resistor.

The portable device 104, as used herein, is a computing device having a display 126 (e.g., a graphical user interface) with user input (e.g., touch, keyboard) and a processor 122 for computing. Portable devices include, but are not limited to, handheld devices, mobile devices, smart phones, laptops, and tablets. The portable device 104 includes the processor 122, which can include logic circuitry with hardware, firmware, and software architecture frameworks for facilitating control of the portable device 104 and/or the planer board 102. In some embodiments, the processor 122 can store application frameworks, kernels, libraries, drivers, application program interfaces, among others, to execute and control hardware and functions discussed herein. Although not shown in FIG. 1, in some embodiments, the portable device 104 and/or the processor 122 can includes a memory and/or a data store for storing data and/or instructions.

The communication I/F 124 can include software and hardware to facilitate data input and output between the components of the portable device 104 and other components of the system 100, namely, the planer board 102. Specifically, the communication I/F 124 can include network interface controllers (not shown) and other hardware and software that manages and/or monitors connections and controls bi-directional data transfer between the communication I/F 124 and other components of the system 100 using, for example, a network (not shown). The communication I/F 124 can facilitate communication (e.g., exchange data, transmit control signals) with the communication I/F 118, using for example, radiofrequency communication or another type of wireless communication. In one example, upon the processor 122 determining that a pressure sensor value (e.g., from the pressure sensor 120) is above a predetermined threshold (e.g., thereby indicating a fish strike), the communication I/F 124 can transmit a control signal to the communication I/F 118 to control the actuator 112 to move the release apparatus 106 to an open position thereby releasing the fishing line 218 from the release apparatus 106.

The display 126 is a visual output interface (e.g., graphical user interface) that allows a user to view information, for example, a pressure sensor value or a number of catches. In some embodiments, the display 126 may also act as a touch input device allowing users to input data, commands, or information into the portable device. In other embodiments, an input actuator (e.g., a button) separate from the display 126 can be used for user input.

Although not shown in FIG. 1, the planer board 102 includes a power source. For example, a rechargeable 3.7-volt lithium ion 3400 mAH battery that is connected to the control unit 110 via a waterproof power switch, namely, a power on/off button 222. The planer board 102 can be charged via a standard cell phone wireless charger. The planer board 102 can also include a light 226. The light 226 can utilize a standard 5 mm RGB common cathode LED. The control unit 110 can supply various amounts of current to the red, green, and blue wires changing the color of the light 226. The color of the light 226 is programmed to be the same color of the planer board 102 to help with identifying board color when fishing at night. The control unit 110 turns the light 226 on as soon as the power on/off button 222 is actuated.

Figure 2:
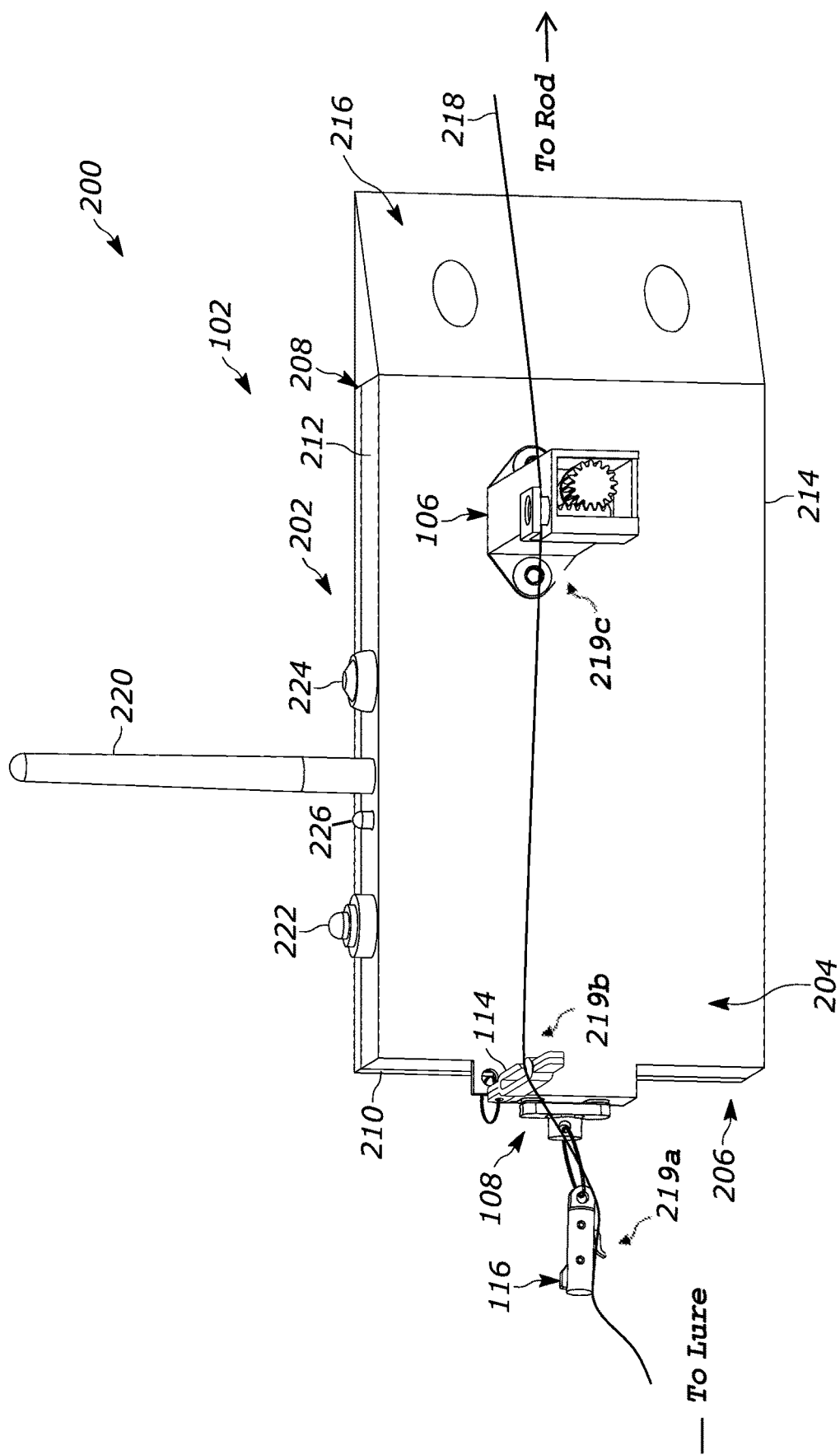
FIG. 2 is a perspective view of a planer board according to one exemplary embodiment.
Figure 5:
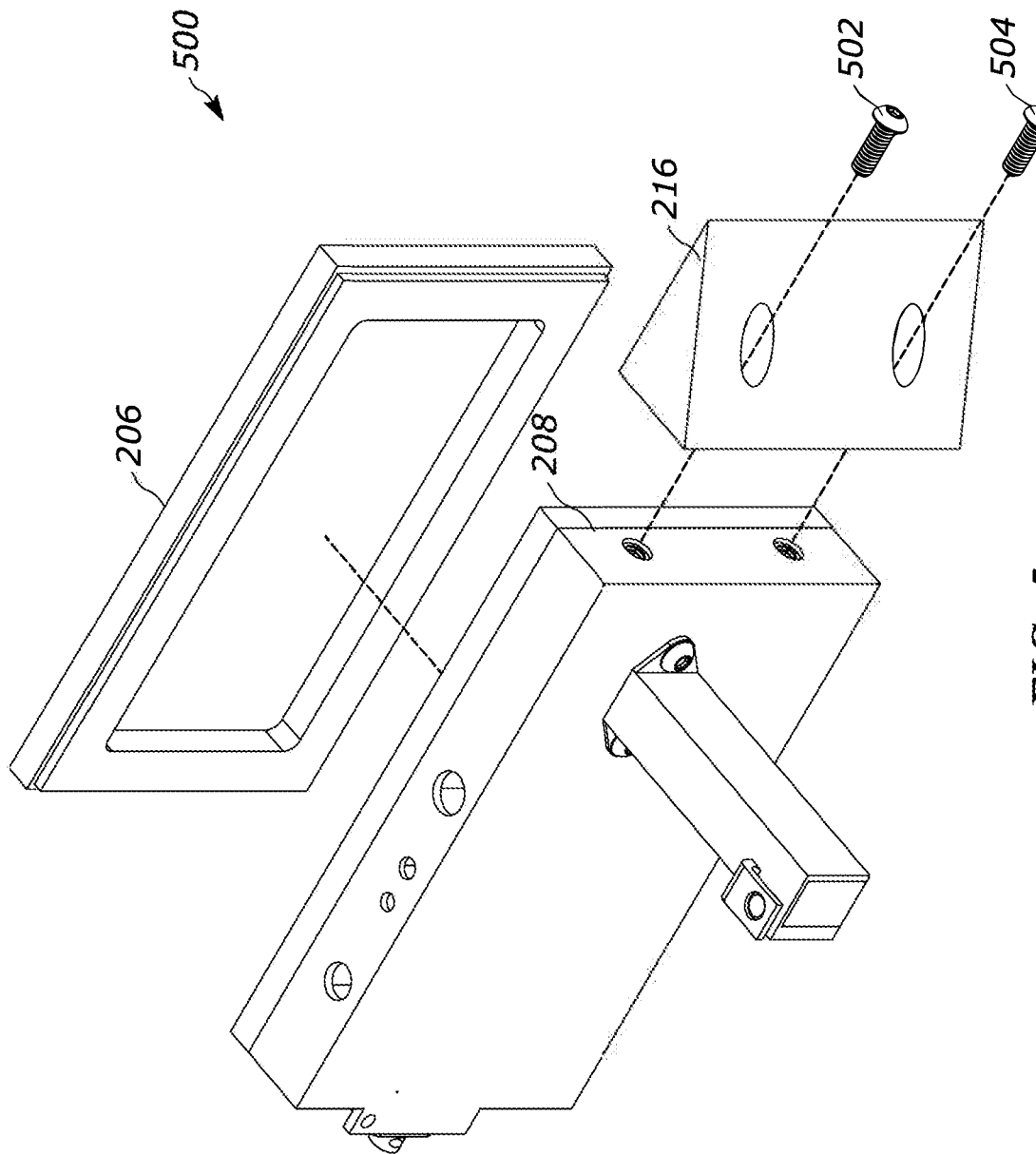
FIG. 5 is a simplified perspective view of the planer board of FIG. 2 showing an exploded view of the front lip according to an exemplary embodiment.

Each component of the system 100 will now be described in more detail with further reference to FIGS. 2 and 5. FIG. 2 is a perspective view 200 of the planer board 102 in use in water (not shown) where the release apparatus 106 is in a closed position thereby gripping a front portion (at a third attachment area 219c) of a fishing line 218 to the planer board 102. FIG. 5 is a simplified perspective view 500 of the planer board 102 including an exploded front lip 216. The planer board 102 has a main body 202 with a first side 204, a second side 206, a front end 208, a rear end 210, and a top edge 212 and a bottom edge 214 creating a water-tight cuboid compartment that can hold other components, for example the control unit 110. A front lip 216 that connects to the front end 208 of the main body 202. The front lip 216 is distally tapered and is the foremost part of the planer board 102 that faces the direction of travel through the water. The tapered design allows the planer board 102 to cut through the water efficiently and move smoothly along the surface of the water.

In FIGS. 2 and 5, the front lip 216 is approximately 2.25" long, a 30-degree taper, and 64 grams in weight. However, the front lip 216 can be a different size, weight, and/or shape other than that shown. For example, the front lip 216 can be 3.75" long with a 20-degree taper or 1.65" long with a 40-degree taper. As shown in FIG. 5, the front lip 216 is interchangeable and can be connected to the main body 202 by a connector 502 and a connector 504. Thus, the front lip 216 is configured to be modularly attached to the front end 208. For example, the user can remove the 2.25" long front lip 216 and attach a front lip of a different length and taper.

Referring again to FIG. 2, when the planer board 102 is in use, a fishing line 218 is attached to the planer board 102 at the strike sensor clip 116, the rear clip 114, and removably attached at the release apparatus 106. More specifically, the fishing line 218 is attached to the strike sensor clip 116 at a first attachment area 219a, the fishing line 218 is attached to the rear clip 114 at a second attachment area 219b, and the fishing line 218 can be gripped by the release apparatus 106 at a third attachment area 219c. In some embodiments described herein, the portion of the fishing line 218 between the strike sensor clip 116 and the rear clip 114 maintains a slack. Said differently, the fishing line 218 between the first attachment area 219a and the second attachment area 219b is not under tension (e.g., sags). The planer board 102 is also attached to the fishing line via the release apparatus 106 at the third attachment area 219c when the release apparatus 106 is in a closed position.

Typically, the fishing line 218 is attached to the planer board 102 at the release apparatus 106 manually prior to dropping the planer board 102 in the water. For example, actuation of the release apparatus 106 can be controlled (in lieu of the portable device 104) by pushing a release apparatus actuator button 224. When the release apparatus actuator button 224 is pressed or the control unit 110 receives an appropriate control signal from the portable device 104, the actuator 112 is triggered to turn 53 degrees which opens and/or closes the release apparatus 106. In this case, prior to dropping the planer board 102 in the water, the release apparatus actuator button 224 is pressed which puts the release apparatus 106 in an open position (see FIG. 3B), then the angler can place the fishing line 218 (i.e., at the third attachment area 219c) in the enclosure 310, and press the release apparatus actuator button 224 again, which then puts the release apparatus 106 in a closed position (see FIG. 3A) thereby attaching the fishing line 218 within the release apparatus 106. The planer board 102 is then placed in the water and is ready for use.

Figure 3A:
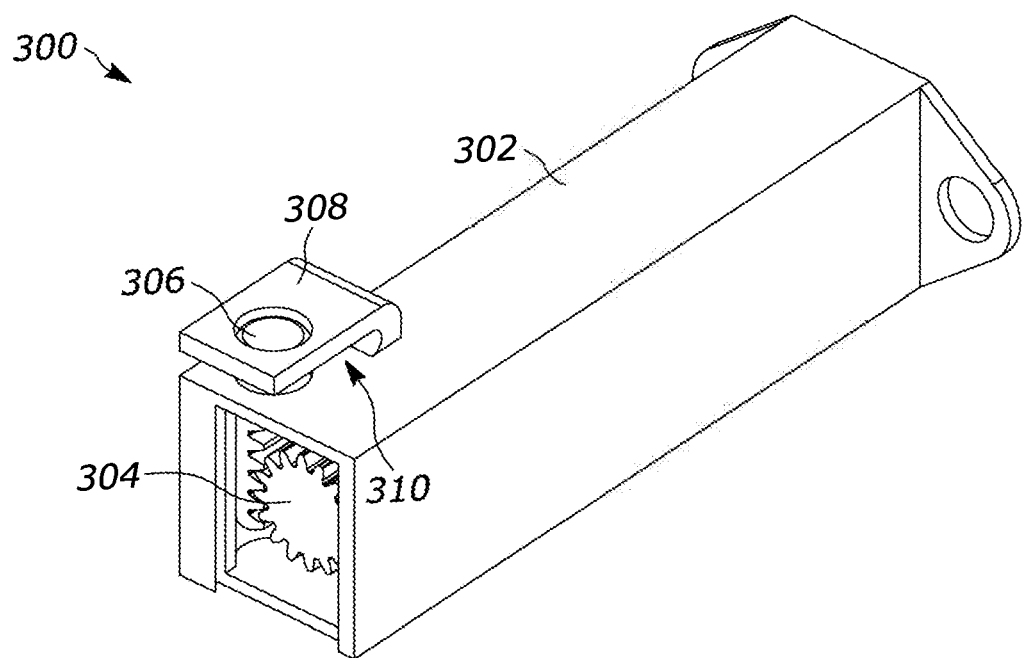
FIG. 3A is a perspective view of a release apparatus in a closed position according to an exemplary embodiment.
Figure 3B:
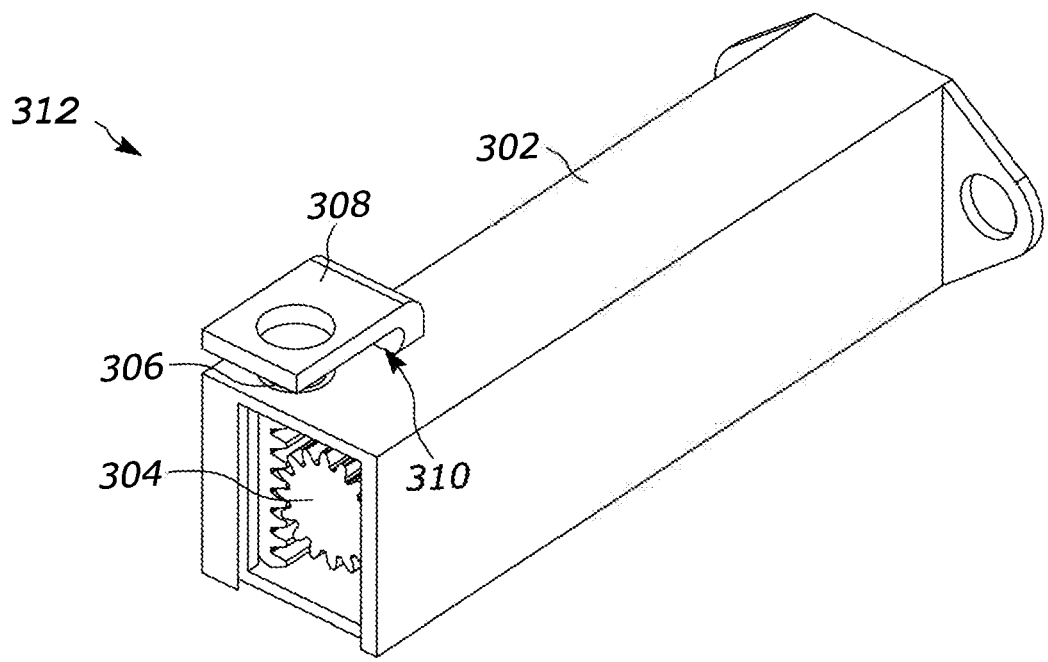
FIG. 3B is a perspective view of the release apparatus of FIG. 3A in an open position according to an exemplary embodiment.

The release apparatus 106 is mounted to the first side 204 of the planer board 102. The release apparatus 106 is remotely controllable between an open position (See FIG. 3B, a perspective view 312 of the release apparatus 106 in an open position) and a closed position (See FIG. 3A, a perspective view 300 of the release apparatus 106 in a closed position). The release apparatus 106 is configured to grip a front portion (i.e., the third attachment area 219c) of a fishing line 218 when in the closed position and release the front portion (i.e., the third attachment area 219c) of the fishing line 218 when in the open position. The front portion of the fishing line 218 includes the third attachment area 219c. As shown in FIGS. 3A and 3B, the release apparatus 106 includes a release arm 302, a release pinion 304, a release rack 306, and a release wall 308. The release arm 302 can be attached to the main body 202 of the planer board 102 by bolts that screw into a brass heat-set insert on the main body 202. The release arm 302 holds the release rack 306, release pinion 304, and a pinion support (not shown). The release pinion 304 can be press fit onto the actuator 112. The pinion support (not shown) suspends the release pinion 304 in the release arm 302 to reduce unwanted forces.

The release arm 302 provides ¾ of the enclosure 310 that holds the fishing line 218. The other ¼ of the enclosure 310 is provided by the release rack 306. When a gear of release pinion 304 spins, the release rack 306 moves linearly. More specifically, the actuator 112 (e.g., a servo motor) motor spins the release pinion 304, which moves the release rack 306 linearly (e.g., up or down). As shown in FIG. 3A, the release rack 306 is in a closed position, up flush with the release wall 308 thereby gripping and/or securing the fishing line 218 (e.g., at the third attachment area 219c) within the enclosure 310. In FIG. 3B, the release rack 306 is in an open position (e.g., the actuator 112 moved the release rack 306 linearly in a downward direction) thereby releasing the fishing line 218 from the enclosure 310. As will be discussed in further detail herein, the control unit 110 can be remotely controlled to control the release apparatus 106 from the closed position to the open position and thereby release the front portion of the fishing line 218.

Figure 4A:
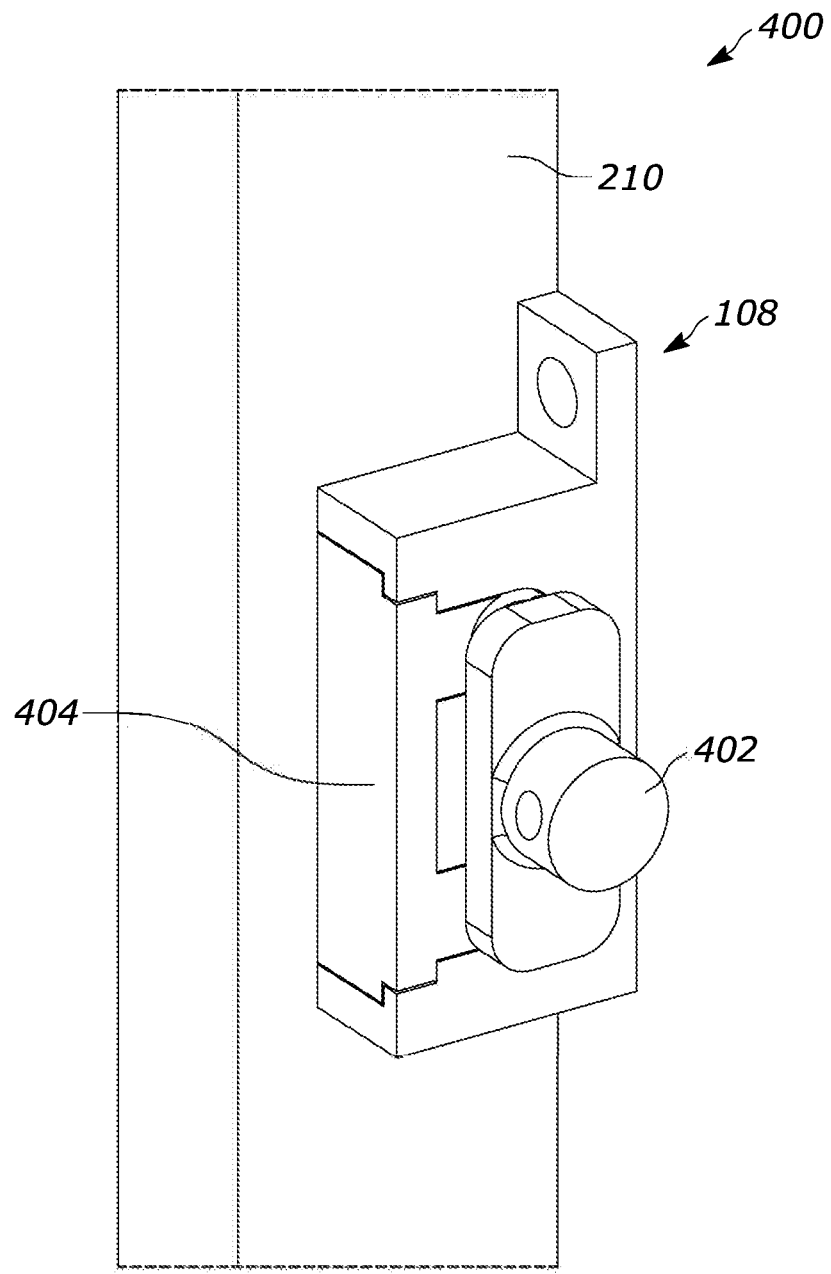
FIG. 4A is a perspective view of a strike apparatus according to an exemplary embodiment.
Figure 4B:
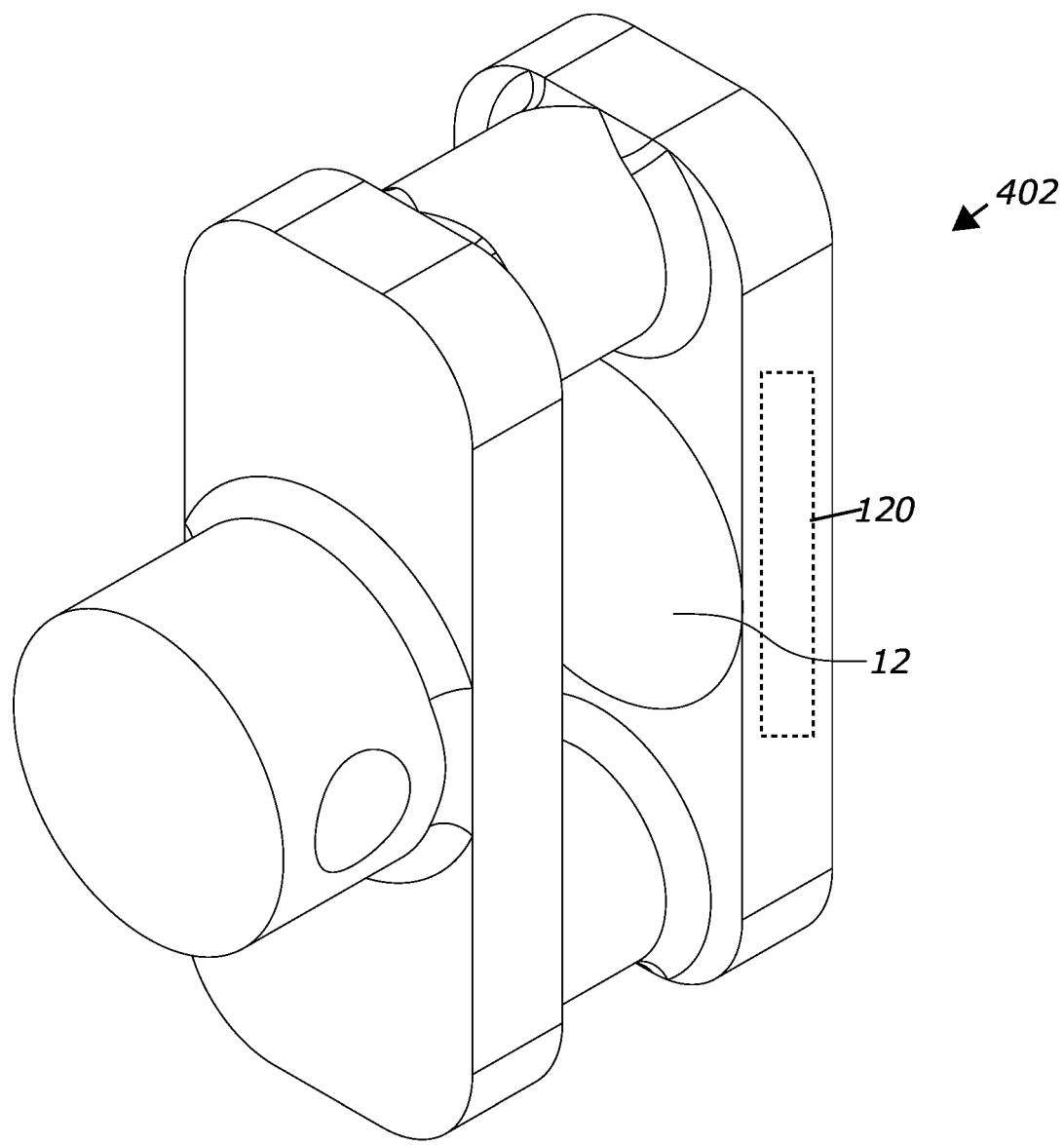
FIG. 4B is a side perspective view of the strike apparatus of FIG. 4A according to an exemplary embodiment.

The strike apparatus 108 will now be described in more detail with reference is FIGS. 4A and 4B. For simplicity, the rear clip 114 and the strike sensor clip 116 are not shown in FIGS. 4A and 4B. FIG. 4A is a perspective view 400 of the strike apparatus 108 showing a pressure sensor actuator 402 and a pressure sensor backing plate 404. FIG. 4B illustrates a perspective side view of the pressure sensor actuator 402 without the planer board 102 and the pressure sensor backing plate 404. The pressure sensor actuator 402 attaches to the rear end 210 of the main body 202. It is held in place by the pressure sensor backing plate 404. The strike sensor clip 116 is attached to the pressure sensor actuator 402. When a lure (not shown) attached to the strike sensor clip 116 is moving in the water, an area 12, which is an elevated area from the back of the pressure sensor actuator 402, pushes up against the pressure sensor 120. Thus, when a fish strikes the lure, the amount that the pressure sensor actuator 402 is squeezing the pressure sensor 120 against the main body 202 increases, and thus the pressure sensor value increases. The pressure sensor value can be transmitted to the portable device 104 and/or can be used to determine whether a fish is on the fishing line 218.

Figure 6:
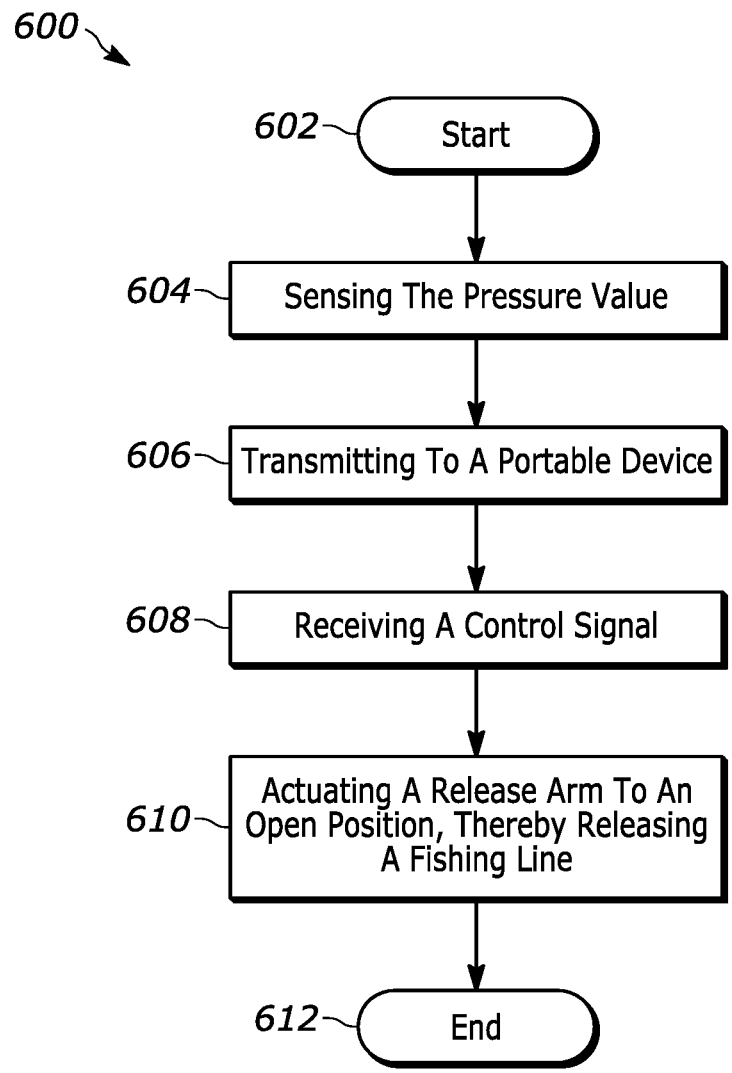
FIG. 6 is a flow chart of a method for trolling according to an exemplary embodiment.

Referring now to FIG. 6, a method 600 for trolling will be described according to an exemplary embodiment and with references to the components described above in FIGS. 1-4. The method 600 begins at block 602 and at block 604 the method 600 includes sensing a pressure value from a pressure sensor mounted to a planer board. The pressure value is an externally generated force on the fishing line 218. The control unit 110 continuously monitors the pressure sensor 120. As pressure is increased on the pressure sensor, the control unit 110 converts the current into a percentage of the total current.

At block 606, the method 600 includes transmitting the pressure value to a portable device. For example, the control unit 110 using the communication I/F 118 (e.g., via the antenna 220) transmits the pressure value to the portable device 104. The processor 122 of the portable device 104 may then display the pressure value via the display 126. At block 608, the method 600 includes receiving a control signal from the portable device. For example, upon determining that the pressure value is above a predetermined threshold, the processor 122 and/or the control unit 110 can actuate the release arm 302 into the open position. In one embodiment, the processor 122 transmits a control signal to the control unit 110 to release the fishing line 218. In another embodiment, a user of the portable device 104 can actuate the release of the fishing line 218 from the release apparatus 106 on-demand with an input to the portable device 104

(e.g., via the display 126 or an input actuator), which than causes the processor 122 to transmit a control signal to the planer board 102.

At block 610, the method 600 includes actuating a release apparatus 106 to an open position, thereby releasing a fishing line. The planer board 102 includes the release apparatus 106 for gripping a portion of the fishing line 218 and actuating the release apparatus 106 includes instructing the actuator to drive the release arm 302 into the open position, thereby releasing the fishing line 218. Accordingly, the processor 122 can transmit the control signal to the control unit 110 and the control unit 110 instructs the actuator 112 to drive the release arm 302 into the open position. This allows for seamless and accurate release of the fishing line 218 from the planer board.

Definitions

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration. Computer communication may utilize any type of wired, wireless, or network communication protocol including, but not limited to, radio frequency, telecommunication and/or cellular network communication.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system.

"Operable connection," or a connection by which entities are "operably connected," is one in which signals, physical communications, and/or logical communications may be sent and/or received. An operable connection may include a wireless interface, a physical interface, a data interface, and/or an electrical interface.

It will be appreciated that various embodiments of the above-disclosed and other features and functions, or alternatives or varieties thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A trolling apparatus, comprising:
   a planer board having a main body with a first side, a second side, a front end, a rear end, and a top edge and a bottom edge creating a water-tight compartment, and a front lip that connects to the front end of the main body; and
   a release apparatus mounted to the first side of the planer board, the release apparatus remotely controllable between an open position and a closed position and configured to grip a front portion of a fishing line when in the closed position and release the front portion of the fishing line when in the open position.

2. The trolling apparatus of claim 1, further comprising a control unit inside the main body, wherein the control unit receives a control signal from a portable device to control the release apparatus between the open position and the closed position.

3. The trolling apparatus of claim 2, further comprising an actuator associated with a release arm of the release apparatus, wherein upon receiving the control signal from the portable device, the control unit instructs the actuator to drive the release arm into the open position.

4. The trolling apparatus of claim 2, further comprising a strike apparatus mounted on the rear end including a pressure sensor for sensing an externally generated force above a threshold on the fishing line installed during use.

5. The trolling apparatus of claim 4, the strike apparatus further comprising a strike sensor clip coupled to the pressure sensor, the strike sensor clip for securing the fishing line to the trolling apparatus installed during use at a first attachment area of the fishing line.

6. The trolling apparatus of claim 5, the strike apparatus further comprising a rear clip attached to the rear end, wherein the fishing line is attached to the trolling apparatus at the strike sensor clip and the rear clip, and the rear clip maintains a slack in the fishing line between the strike sensor clip and the rear clip.

7. The trolling apparatus of claim 4, wherein the control unit transmits a pressure value sensed by the pressure sensor to a portable device.

8. The trolling apparatus of claim 1, wherein the front lip is configured to be modularly attached to the front end.

9. The trolling apparatus of claim 1, wherein the front lip is distally tapered.

10. A system for trolling, comprising:
    a planer board having a release apparatus configured to grip a front portion of a fishing line when in a closed position and release the fishing line when in an open position;
    a portable device for remotely controlling the release apparatus from the closed position to the open position; and
    a processor operatively connected for computer communication to the planer board and the portable device, wherein the processor:
       upon receiving a control signal from the portable device, controls an actuator to move the release apparatus between the open position and the closed position.

11. The system of claim 10, the planer board further comprising a strike apparatus mounted to a rear end of the planer board, the strike apparatus comprising a pressure sensor and a strike sensor clip attached to the pressure sensor, the strike sensor clip for securing the fishing line at a first attachment point of the fishing line to the planer board.

12. The system of claim 11, wherein the pressure sensor measures an externally generated force on the fishing line.

13. The system of claim 12, wherein the processor transmits a value of the externally generated force to the portable device.

14. The system of claim 11, wherein the strike apparatus further comprises a rear clip attached to the rear end, wherein the fishing line is attached to the planer board at the strike sensor clip and the rear clip.

15. The system of claim 14, wherein the rear clip maintains a slack in a portion of the fishing line between the strike sensor clip and the rear clip.

16. A method for trolling, comprising:
sensing a pressure value from a pressure sensor mounted to a planer board;
transmitting the pressure value to a portable device;
receiving a control signal from the portable device; and
actuating a release apparatus to an open position, thereby releasing a fishing line.

17. The method of claim 16, wherein the planer board includes the release apparatus for gripping a portion of the fishing line and wherein actuating the release apparatus includes instructing the actuator to drive a release arm into the open position, thereby releasing the fishing line.

18. The method of claim 17, wherein sensing the pressure value further includes upon determining the pressure value is above a threshold, actuating the release arm to the open position.

19. The method of claim 16, wherein the pressure value is an externally generated force on the fishing line.

20. The method of claim 16, wherein the planer board includes a strike sensor clip and a rear clip on a rear end of the planer board for securing the fishing line when in use to the planer board.

* * * * *